United States Patent
Kim et al.

(10) Patent No.: US 9,193,340 B2
(45) Date of Patent: Nov. 24, 2015

(54) WHEEL SPEED SENSOR INTERFACE, OPERATION METHOD THEREOF, AND ELECTRONIC CONTROL SYSTEM INCLUDING THE SAME

(71) Applicant: Electronics and Telecommunications Research Institute, Daejeon (KR)

(72) Inventors: Yi-Gyeong Kim, Daejeon (KR); Min-Hyung Cho, Daejeon (KR); Young-deuk Jeon, Daejeon (KR); Tae Moon Roh, Daejeon (KR); Jong-Kee Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/259,036

(22) Filed: Apr. 22, 2014

(65) Prior Publication Data

US 2015/0120164 A1 Apr. 30, 2015

(30) Foreign Application Priority Data

Oct. 31, 2013 (KR) ........................ 10-2013-0131369

(51) Int. Cl.
| | | |
|---|---|---|
| *B60T 7/12* | (2006.01) | |
| *B60T 8/32* | (2006.01) | |
| *G01P 3/56* | (2006.01) | |
| *G01P 3/44* | (2006.01) | |
| *B60T 8/171* | (2006.01) | |
| *B60T 8/88* | (2006.01) | |

(52) U.S. Cl.
CPC . *B60T 8/32* (2013.01); *B60T 8/171* (2013.01); *B60T 8/885* (2013.01); *G01P 3/44* (2013.01); *G01P 3/56* (2013.01)

(58) Field of Classification Search
CPC ....... H04L 7/048; H04L 5/04; H01S 5/06812; H01S 5/50; H01S 5/0427; H01S 5/06253; H01S 5/5018; H04N 9/8063; H04N 9/8205; H04N 9/8233; H04N 13/0048; H04N 21/2365; H04N 21/4347; H04J 14/02; H04J 14/0282; H04J 14/0227; H04J 14/0246; H04J 14/0247; H04J 14/025; H04J 14/0252; H04J 2014/0253; H04J 3/0605; H04J 3/1605
USPC .......................................................... 701/74
See application file for complete search history.

(56) References Cited

U.S. PATENT DOCUMENTS

| | | |
|---|---|---|
| 5,404,304 A | 4/1995 | Wise et al. |
| 8,058,910 B1 * | 11/2011 | Wright .......................... 327/143 |
| 2001/0027362 A1 | 10/2001 | Nishida et al. |
| 2005/0233717 A1 * | 10/2005 | Iwakuni ......................... 455/133 |
| 2012/0051492 A1 * | 3/2012 | Grose et al. ..................... 377/20 |

FOREIGN PATENT DOCUMENTS

| | | | |
|---|---|---|---|
| KR | 10-2008-0098182 A | 11/2008 | |
| KR | 10-2011-0064007 A | 6/2011 | |
| KR | 10-2013-0052455 A | 5/2013 | |

* cited by examiner

Primary Examiner — Muhammad Shafi (57) ABSTRACT

Provided is a wheel speed sensor interface. The wheel speed sensor interface includes: a speed pulse detection circuit configured to receive a plurality of sensor signals including wheel speed information of a vehicle, detect a plurality of speed pulses on the basis of the plurality of the received sensor signals, and transmit the plurality of the detected speed pulses to an external device; and a comparison speed detection circuit configured to generate a plurality of counting values by counting each of the detected speed pulses, generate comparison speed information by multiplexing the plurality of the generated counting values through a time division method, and transmit the generated comparison speed information to the external device.

10 Claims, 8 Drawing Sheets

WHEEL SPEED SENSOR INTERFACE, OPERATION METHOD THEREOF, AND ELECTRONIC CONTROL SYSTEM INCLUDING THE SAME

CROSS-REFERENCE TO RELATED APPLICATIONS

This U.S. non-provisional patent application claims priority under 35 U.S.C. §119 of Korean Patent Application No. 10-2013-0131369, filed on Oct. 31, 2013, the entire contents of which are hereby incorporated by reference.

BACKGROUND OF THE INVENTION

The present invention disclosed herein relates to an electronic control system, and more particularly, to a wheel speed sensor interface, an operation method thereof, and an electronic control system including the same.

Various electronic control systems (ECU) based on an electronic control method are used in order to control a vehicle. A vehicle control system is one of electronic control systems, includes an anti-lock brake system (ABS), a traction control system (TCS), and an electronic stability system (ESC).

An electronic control system uses various detection sensors or drive signals of a vehicle to detect a state of the vehicle. For example, the electronic control system receives wheel speed information from wheel speed sensors to detect the speed of a vehicle. The electronic control system detects the speed of a vehicle based on the received wheel speed information and controls operations and components of the vehicle based on the detected result.

As electronics technology develops recently, in order for the electronic control system to include components performing various functions within the same area, the miniaturization of the components is required. Furthermore, since the electronic control system controls a vehicle, its errors are closely related to the safety of a driver. That is, the reliability of sensor signals inputted to the electronic control system or drive signals for driving components of a vehicle is very important. Accordingly, electronic control systems satisfying the reliability sensor and drive signals and having a less size are required recently.

SUMMARY OF THE INVENTION

The present invention provides a wheel speed sensor interface having improved reliability and reduced size, an operation method thereof, an electronic control system including the same.

Embodiments of the present invention provide wheel speed sensor interfaces including: a speed pulse detection circuit configured to receive a plurality of sensor signals including wheel speed information of a vehicle, detect a plurality of speed pulses on the basis of the plurality of the received sensor signals, and transmit the plurality of the detected speed pulses to an external device; and a comparison speed detection circuit configured to generate a plurality of counting values by counting each of the detected speed pulses, generate comparison speed information by multiplexing the plurality of the generated counting values through a time division method, and transmit the generated comparison speed information to the external device.

In some embodiments, the comparison speed detection circuit comprises: a plurality of counters configured to generate a plurality of counting values by counting each of the plurality of the detected speed pulses; and a time division multiplexer configured to receive the plurality of the generated counting values and transmit the comparison speed information to the external device by multiplexing the plurality of the received counting values through the time division method.

In other embodiments, when a control signal of the external device is activated, the plurality of the counters may count the plurality of the detected speed pulses, and when the control signal of the external device is deactivated, the time division multiplexer may transmit the comparison speed information by multiplexing the plurality of the received counting values through a time division method.

In still other embodiments, when the comparison speed information is transmitted completely, the time division multiplexer may output a reset signal.

In even other embodiments, the plurality of the counters may reset the plurality of the generated counting values in response to the reset signal.

In yet other embodiments, the time division multiplexer may transmit the comparison speed information to the external device through a single channel.

In further embodiments, each of the plurality of the wheel speed sensor signals may include wheel speed information and wheel state information.

In still further embodiments, each of the plurality of the wheel speed pulses may be speed information on wheels of the vehicle.

In other embodiments of the present invention, operation methods of a wheel speed sensor interface include: receiving a plurality of sensor signals including speed information on wheels of a vehicle; detecting a plurality of speed pulses on the basis of the plurality of the received sensor signals; receiving an activated control signal from an external device; generating a plurality of counting values by counting the detected wheel speed pulses in response to the received control signal; transmitting comparison speed information to the external device by multiplexing the plurality of the counting values through a time division method; and resetting the plurality of the counting values after the comparison speed information is transmitted completely.

In other embodiments, the transmitting of the comparison speed information to the external device may include, when the control signal is deactivated, generating the comparison speed information and transmitting the generated comparison speed information to the external device.

In still other embodiments of the present invention, electronic control systems include: a wheel speed sensor unit configured to output a plurality of sensor signals by detecting speeds of each of a plurality of wheels in a vehicle; a wheel speed sensor interface configured to receive the plurality of the sensor signals and output a plurality of speed pulses and comparison speed information on the basis of the plurality of the received sensor signals; and a micron control unit configured to receive the plurality of the speed pulses, detecting a state of the vehicle on the basis of the plurality of the received speed pulses, and control the vehicle on the basis of the detected result, wherein the micro control unit detects an error of the plurality of the speed pulses on the basis of the comparison speed information and the wheel speed sensor interface transmits the comparison speed information to the micro control unit through a time division method. In other embodiments, the wheel speed sensor interface may include: a wheel speed pulse detection circuit configured to detect a plurality of speed pulses on the basis of the plurality of the received sensor signals; and a comparison speed detection circuit configured to generate a plurality of counting values by counting the plurality of the detected speed pulses and generate the comparison speed information on the basis of the plurality of the generated counting values. In still other embodiments, the comparison speed detection circuit may include: a plurality of counters configured to count the plurality of the speed pulses in response to a control signal of the micro control unit; and a time division multiplexer configured to output the comparison speed information by multiplexing the plurality of the counting values through a time division method.

In even other embodiments, when the control signal is activated, the plurality of the counters may generate the plurality of the counting values by counting each of the plurality of the speed pulses and when the control signal is deactivated, the time division multiplexer may transmit the comparison speed information to the micro control unit through the time division method.

In yet other embodiments, when the comparison speed information is transmitted completely, the time division multiplexer may output a reset signal and the plurality of the counters may reset the plurality of the counting values in response to the reset signal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

According to embodiments of the present invention, as comparison speed information for error check is transmitted according to a control of a micro control unit (MCU) through a time division method, the MCU may perform an error check function efficiently.

Additionally, since multiple wheel speed information is multiplexed based on a time division method and transmitted as comparison speed information, two hardware pins for control signal transmission and reception and comparison speed information transmission are required. Therefore, a configuration of an analog system on chip (SoC) becomes simple. Moreover, provided are a wheel speed sensor interface having improved reliability and reduced size, an operation method thereof, an electronic control system including the same.

Hereinafter, it will be described about an exemplary embodiment of the present invention in conjunction with the accompanying drawings.

Figure 1:
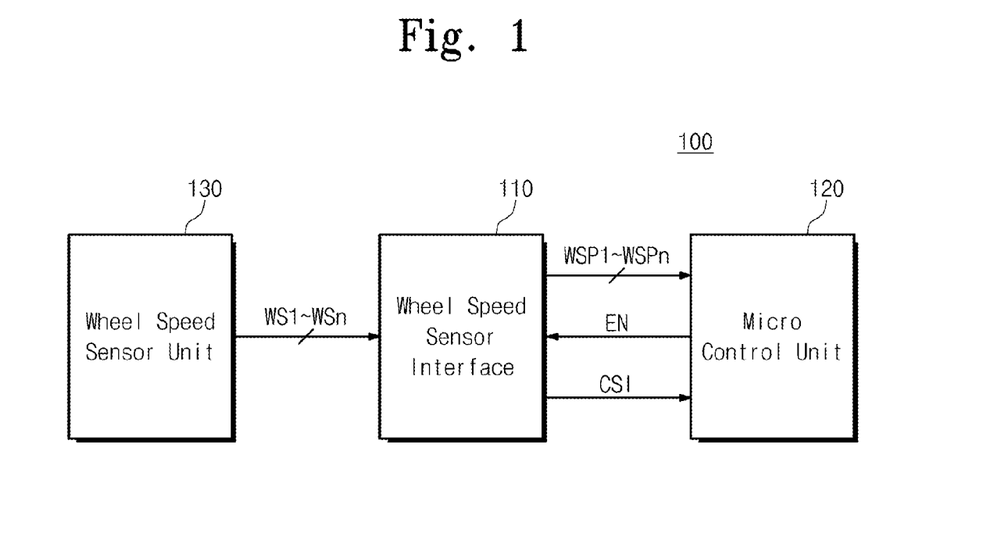
FIG. 1 is a block diagram illustrating an electronic control system 100 according to an embodiment of the present invention.

FIG. 1 is a block diagram illustrating an electronic control system 100 according to an embodiment of the present invention. Referring to FIG. 1, the electronic control system 100 detects a state of a vehicle on the basis of various sensors and drive signals and controls components (for example, an engine, a transmission, a brake, a wheel, a headlight, a steering wheel, a pump motor, and a solenoid valve) of the vehicle on the basis of the detected state of the vehicle. The electronic control system 100 includes a wheel speed sensor interface 110, an MCU 120, and a wheel speed sensor unit 130.

The wheel speed sensor interface 110 may receive a plurality of sensor signals WS1 to WSn (for example, wheel speed sensor signals) indicating the rotational speeds of the wheels of a vehicle from the wheel speed sensor 140. The wheel speed interface 110 generates a plurality of speed pulses WSP1 to WSPn on the basis of the plurality of the received sensor signals WS1 to WSn and transmits the plurality of the generated speed pulses WSP1 to WSPn to the MCU 120.

The MCU 120 may detect a current state of the vehicle, for example, the vehicle's speed and moving direction, on the basis of the plurality of speed pulses WSP1 to WSPn received from the wheel speed interface 110. The MCU 120 may control the wheels of a vehicle on the basis of the detected state of the vehicle.

For example, the MCU 120 may control the wheel speed interface 110 on the basis of a control signal EN. The wheel speed interface 110 may transmit comparison speed information CSI in response to the control signal EN. The comparison speed information CSI may be a comparison signal or a reference signal for detecting errors of the speed pulses WSP1 to WSPn. The MCU 120 may detect an error by comparing the comparison speed information CSI with the speed pulses WSP1 to WSPn.

Figure 2:
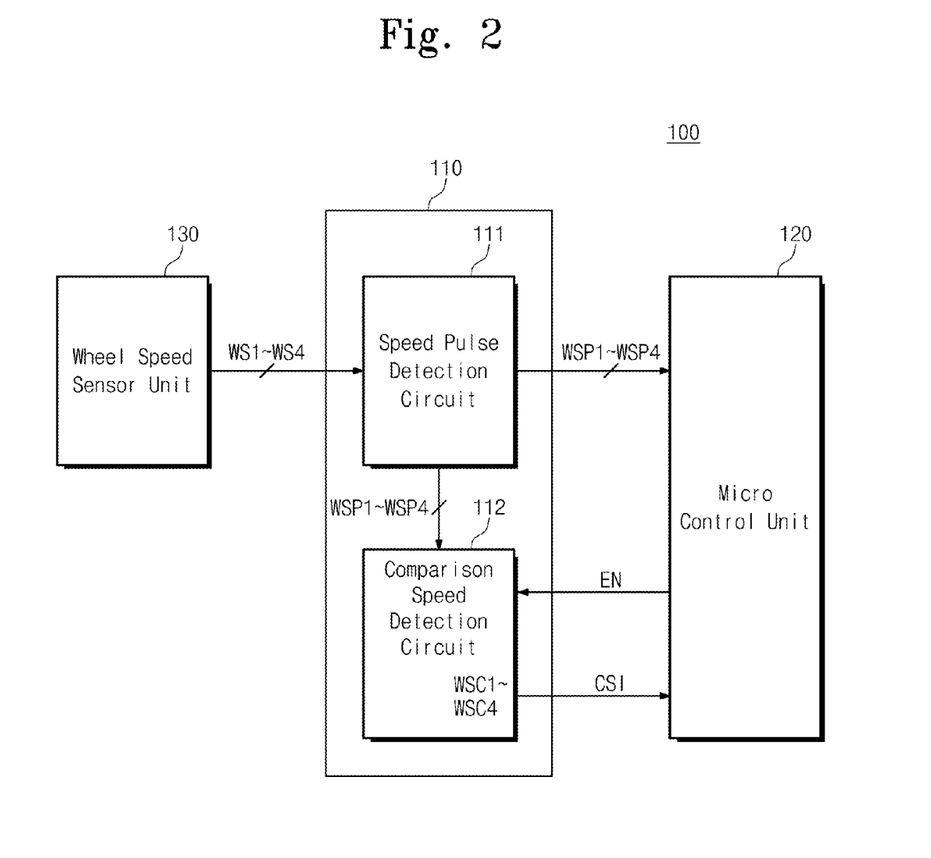
FIG. 2 is a block diagram illustrating a wheel speed interface shown in FIG. 1.
Figure 3:
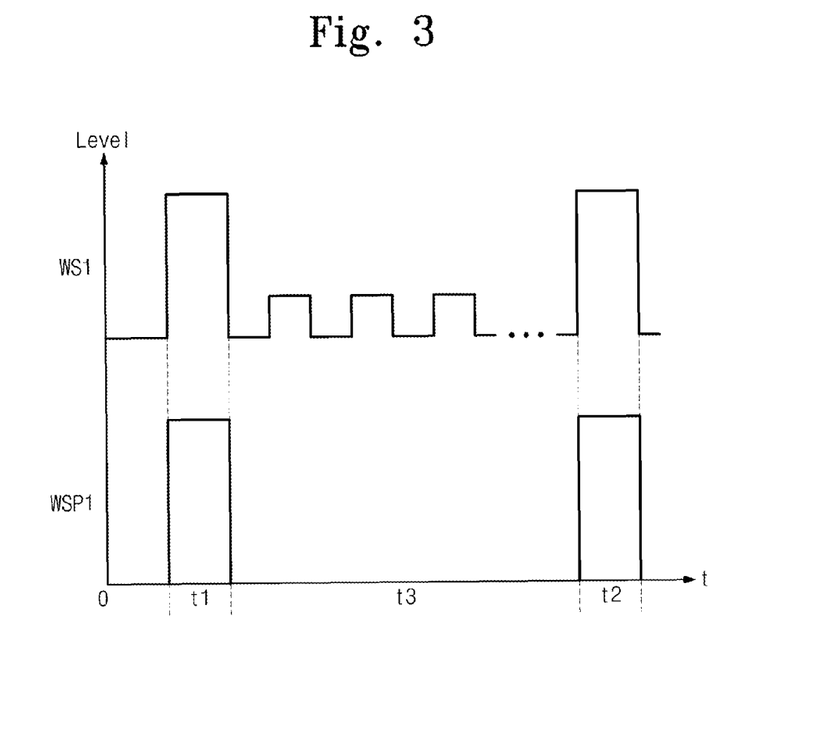
FIG. 3 is a graph illustrating a first sensor signal and a first speed pulse.

FIG. 2 is a block diagram illustrating a wheel speed interface shown in FIG. 1. FIG. 3 is a graph illustrating a first sensor signal and a first speed pulse. For concise description, it is assumed that the wheel speed sensor unit 130 detects the wheel speeds of the four wheels and outputs first to fourth sensor signals WS1 to WS4. However, the present invention is not limited thereto.

Referring to FIGS. 1 and 2, the wheel speed interface 110 includes a speed pulse detection circuit 111 and a comparison speed detection circuit 112. The speed pulse detection circuit 111 receives the first to fourth sensor signals WS1 to WS4 from the wheel speed sensor unit 130. The speed pulse detection circuit 111 may detect a pulse including speed information from the received first to fourth sensor signals WS1 to WS4.

For example, the wheel speed sensor unit 130 may include single pulse type sensor, PWM type sensor, or VDA data protocol type sensor. A sensor signal outputted from a single pulse type sensor includes only speed information. However, sensor signals outputted from a PWM type sensor and a VDA data protocol type sensor include information other than speed information.

For example, when the wheel speed sensor unit 130 includes VDA data protocol type sensors, the first wheel speed sensor signal WS1 may have a first waveform WS1 as shown in FIG. 3. In this case, the first wheel speed sensor signal WS1 may include various information. For example, a pulse of the first waveform WS1 may be a signal indicating a wheel speed during first and second timings t1 and t2. Signals during a third timing t3 may be signals indicating information such as vehicle's wheel forward, backward, direction, acceleration, and state of wheel. At this point, the speed pulse detection circuit 111 may detect pulses indicating a wheel speed such as the first speed pulse WSP1 shown in FIG. 3. For example, the speed pulse detection circuit 111 performs the same operation on the second to fourth sensor signals WS2 to WS4 to generate second to fourth speed pulses WSP2 to WSP4.

The speed pulse detection circuit 111 transmits the generated first to fourth speed pulses WSP1 to WSP4 to the MCU 120 and the comparison speed detection circuit 112.

The comparison speed detection circuit 112 counts the first to fourth wheel speed pulse signals WSP1 to WSP4 received in response to the control signal EN of the MCU 120 and then transmits the counting value to the MCU 120.

For example, when the control signal EN is activated (that is, the control signal EN is logic high), the comparison speed detection circuit 112 counts each of the first to fourth speed pulses WSP1 to WSP4 and generates first to fourth counting values WSC1 to WSC4.

Then, when the control signal EN is deactivated, the comparison speed detection circuit 112 multiplexes the generated first to fourth counting values WSC1 to WSC4 on the basis of a time division method to generate comparison speed information CSI and then transmits the generated comparison speed information CSI to the MCU 120. That is, the comparison speed detection circuit 112 transmits the comparison speed information CSI to the MCU 120 through a time division method.

The MCU 120 detects a state of a vehicle on the basis of the received first to fourth speed pulses WSP1 to WSP4, and controls the vehicle on the basis of a detected result. At this point, the MCU 120 may detect an error of the first to fourth speed pulses WSP1 to WSP4 on the basis of the received comparison speed information CSI.

According to the above-mentioned embodiment of the present invention, the wheel speed sensor interface 110 detects a plurality of speed pulses on the basis of a plurality of sensor signals and then transmits the plurality of the detected speed pulses to the MCU 120. The MCU 120 may control the vehicle on the basis of the received speed pulses. At this point, the wheel speed sensor interface 110 transmits the comparison speed information CSI to the MCU 120 through a time division method in response to a control signal EN of the MCU 120. The MCU 120 may continuously detect an error of a plurality of speed pulses on the basis of the comparison speed information CSI. Accordingly, a wheel speed sensor interface having improved reliability and operating with a reduced cost is provided.

Figure 4:
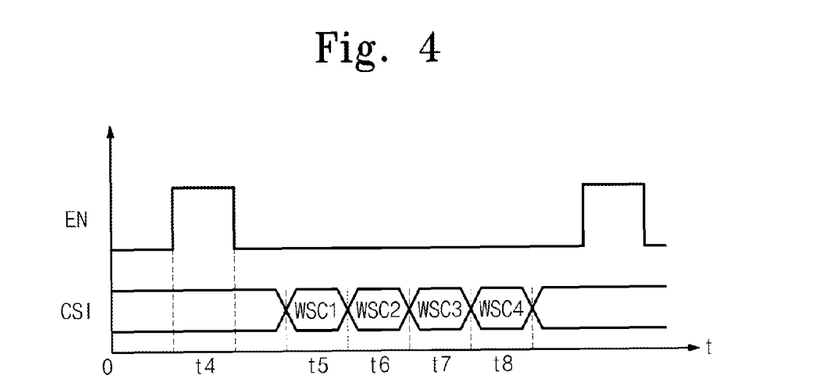
FIG. 4 is a timing diagram illustrating a control signal and comparison speed information shown in FIG. 2.

FIG. 4 is a timing diagram illustrating a control signal and comparison speed information shown in FIG. 2. Referring to FIGS. 2 and 4, the MCU 120 activates a control signal EN during a fourth timing t4. During the fourth time t4 at which the control signal EN is activated, the comparison speed detection circuit 112 counts the first to fourth speed pulses WSP1 to WSP4 and generates first to fourth counting values WSC1 to WSC4.

Then, during fifth to eighth timings t5 to t8, the comparison speed detection circuit 112 transmits the first to fourth counting values WSC1 to WSC4 to the MCU 120 through one channel (that is, a channel where one pin of a well speed sensor interface is connected to one pin of a MCU). For example, the comparison speed detection circuit 112 transmits the first to fourth counting values WSC1 to WSC4 through a time division method. For example, the first to fourth counting values WSC1 to WSC4 may include the speed information on first to fourth speed pulses WSP1 to WSP4, respectively.

As mentioned above, the wheel speed interface 110 transmits speed information on a plurality of speed pulses through a time division method in response to the control signal EN of the MCU 120. Accordingly, since the number of channels required for transmitting speed information for error detection is reduced, a wheel speed sensor interface having a reduced area is provided.

Figure 5:
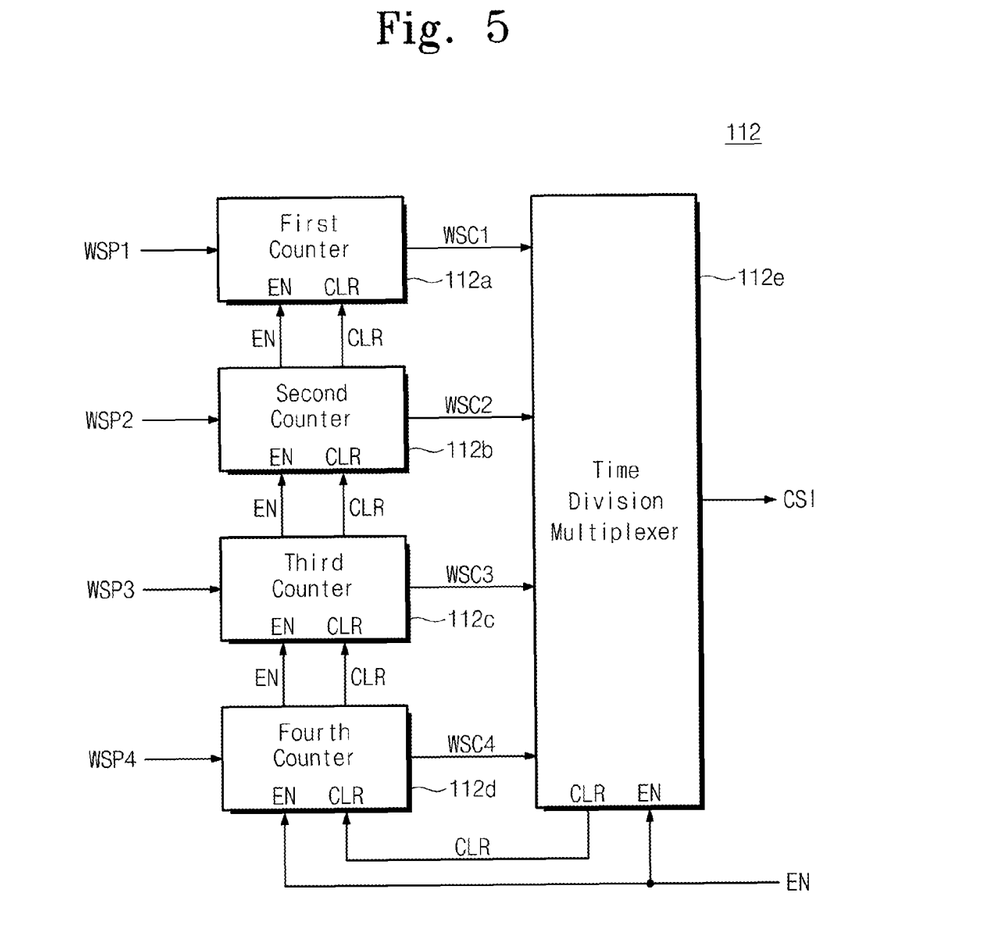
FIG. 5 is a block diagram illustrating a comparison speed detection circuit shown in FIG. 2.

FIG. 5 is a block diagram illustrating a comparison speed detection circuit shown in FIG. 2. Referring to FIGS. 2 to 5, the comparison speed detection circuit 112 includes first to fourth counters 112a and 112d and a time division multiplexer 112e.

The first to fourth counters 112a to 112d receive first to fourth speed pulse signals WSP1 to WSP4, respectively. The first to fourth counters 112a to 112d count the first to fourth speed pulse signals WSP1 to WSP4, respectively, in response to a control signal EN. For example, the first counter 112a outputs a first counting value WSC1 by counting the first speed pulse WSP1. The first counting value WSC1 may indicate wheel speed information included in the first speed pulse WSP1. The first counting value WSC1 is transmitted to the time division multiplexer 112e. The second to fourth counters 112b to 112d generate the second to fourth counting values WSC2 to WSC4 through a similar operation to the first counter 112a and transmit the generated second to fourth counting values WSC2 to WSC4 to the time division multiplexer 112e.

The time division multiplexer 112e outputs comparison speed information CSI on the basis of the received first to fourth counting values WSC1 to WSC4. For example, when the controls signal EN is deactivated, like the method described with reference to FIG. 4, the time division multiplexer 112e outputs comparison speed information CSI on the basis of the first to fourth counting values WSC1 to WSC4 through a time division method. The outputted comparison speed information CSI is transmitted to the MCU 120. For example, the time division multiplexer 112e may have a configuration of a parallel input—serial time division output.

After completing the transmission of the comparison speed information CSI, the time division multiplexer 112e may output a reset signal CLR. The first to fourth counters 112a to 112d reset first to fourth counting values WSC1 to WSC4, respectively, in response to the reset signal CLR. Then, once the control signal EN is activated again, the above-mentioned operation is performed repeatedly.

According to the above-mentioned embodiment of the present invention, the wheel speed sensor interface 110 transmits comparison speed information CSI through a time division method in response to a control signal EN of the MCU 120. The MCU 120 may continuously detect errors of a plurality of wheel speed pulse signals on the basis of the comparison speed information CSI. That is, since the number of hardware pins required for the MCU 120 to detect an error is reduced, a wheel speed sensor interface having improved reliability and reduced area is provided.

Figure 6:
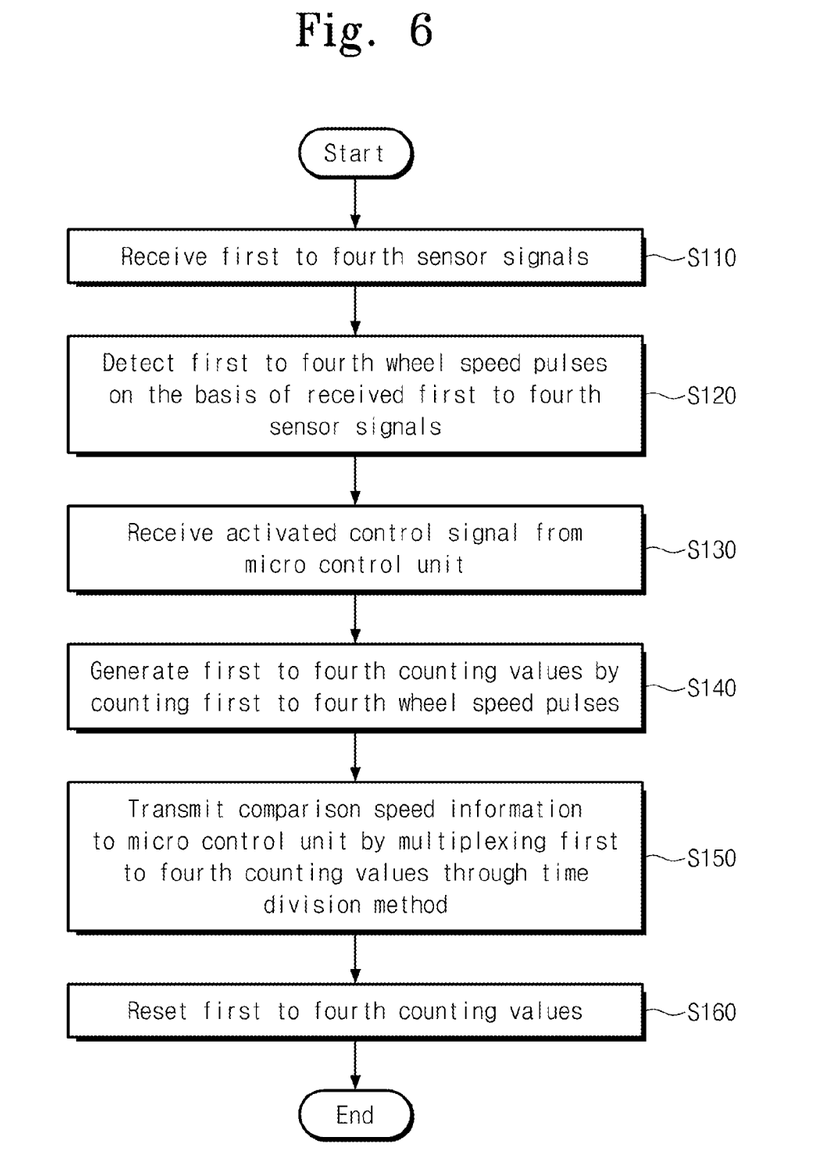
FIG. 6 is a flowchart illustrating operations of a wheel speed sensor interface shown in FIG. 2.

FIG. 6 is a flowchart illustrating operations of the wheel speed sensor interface shown in FIG. 2. Referring to FIGS. 2 and 6, in step S110, the wheel speed sensor interface 110 receives first to fourth sensor signals WS1 to WS4 from the wheel speed sensor unit 130.

In step S120, the wheel speed sensor interface 110 may detect the first to fourth speed pulses WSP1 to WSP4 on the basis of the received first to fourth sensor signals WS1 to WS4. For example, as described with reference to FIG. 3, each of the first to fourth sensor signals WS1 to WS4 may include information (for example, forward, backward, and a state of a wheel) other than the wheel speed information. The speed pulse detection circuit 111 may generate the first to fourth speed pulses WSP1 to WSP4 by detecting a wheel speed pulse of the first to fourth sensor signals WS1 to WS4.

In step S130, the wheel speed sensor interface 110 may receive an activated control signal EN from the MCU 120.

In step S140, the wheel speed sensor interface 110 counts the first to fourth speed pulses WSP1 to WSP4 in response to the control signal EN and then generates the first to fourth counting values WSC1 to WSC4.

In step S150, the wheel speed sensor interface 110 transmits the first to fourth counting values WSC1 to WSC4 to the MCU 120 through a time division method. For example, the wheel speed sensor interface 110 multiplexes the first to fourth counting values WSC1 to WSC4 through a time division method and outputs them as comparison speed information CSI.

In step S160, the wheel speed sensor interface 110 resets the first to fourth counting values WSC1 to WSC4.

In exemplary embodiments, the wheel speed sensor interface 110 may transmit the comparison speed information CSI to the MCU 120 by performing the above-mentioned operation repeatedly. Accordingly, the MCU 120 may perform a continuous error check on the first to fourth speed pulses WSP1 to WSP4. Therefore, a wheel speed sensor interface having improved reliability and reduced area is provided.

Figure 7:
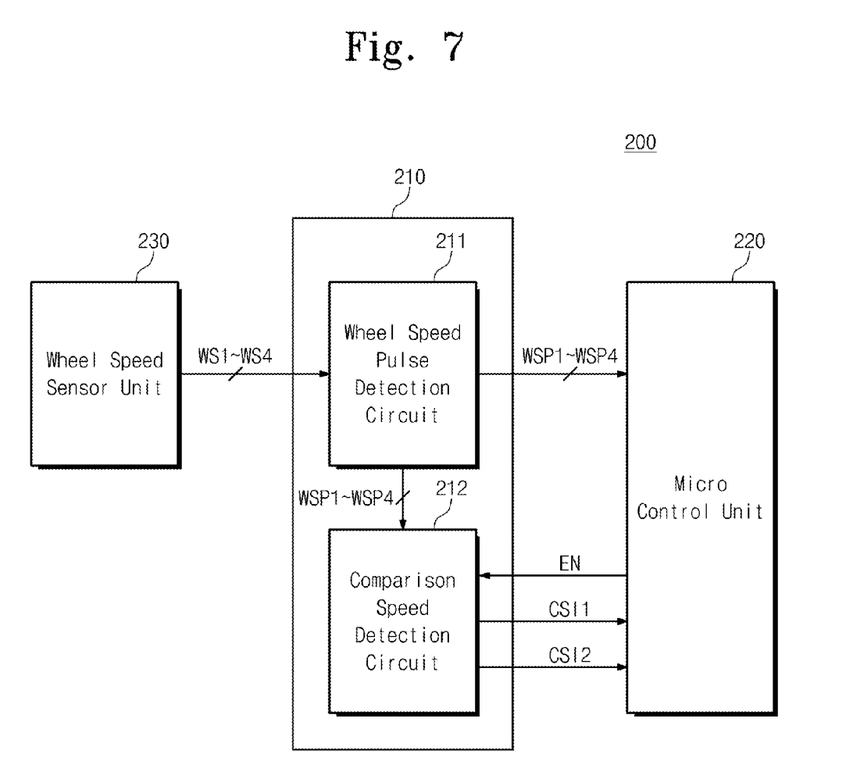
FIG. 7 is a block diagram illustrating an electronic control system according to another embodiment of the present invention.

FIG. 7 is a block diagram illustrating an electronic control system according to another embodiment of the present invention. For ease of description, components unnecessary for describing operation of a wheel speed interface are omitted. Referring to FIG. 7, the electronic control system 200 includes a wheel speed sensor interface 210, an MCU 220, and a wheel speed sensor unit 230. The wheel speed sensor interface 210 includes a speed pulse detection circuit 211 and a comparison speed detection circuit 212.

Since the speed pulse detection circuit 211, the MCU 220, and the wheel speed sensor unit 230 were described with reference to FIG. 2, their detailed descriptions are omitted.

The comparison speed detection circuit 212 of FIG. 7 may transmit comparison speed information CSI through a plurality of channel unlike the comparison speed detection circuit 112 of FIG. 2. For example, the comparison speed detection circuit 212 may count first to fourth speed pulses WSP1 to WSP4 in response to a control signal EN of the MCU 220. The comparison speed detection circuit 212 may transmit the counting values to the MCU 220 through a plurality of channels. At this point, the comparison speed detection circuit 212 may divide the counting values into predetermined groups and then may transmit the divided predetermined groups to the MCU 230 through a time division method.

For example, the comparison speed detection circuit 212 multiplexes first and second counting values WSC1 and WSC2 to generate first comparison speed information CSI1. The comparison speed detection circuit 212 multiplexes third and fourth counting values WSC3 and WSC4 to generate second comparison speed information CSI2. The comparison speed detection circuit 212 may transmit the first and second comparison speed information CSI1 and CSI2 to the MCU 220 through respective first and second channels.

That is, the comparison speed detection circuit 212 transmits comparison speed information through at least two channels and comparison speed information transmitted through respective channels may be a signal obtained by multiplexing at least two counting values.

Figure 8:
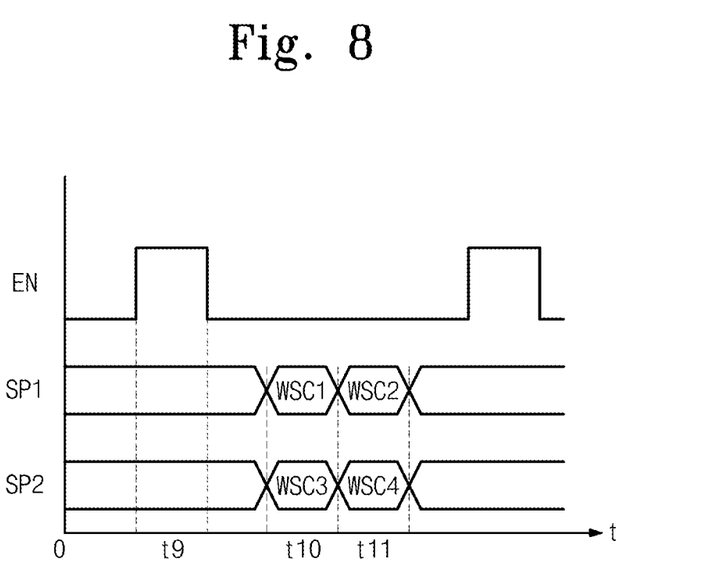
FIG. 8 is a timing illustrating a control signal and a plurality of comparison speed information shown in FIG. 7.

FIG. 8 is a timing illustrating a control signal and a plurality of comparison speed information shown in FIG. 7. Referring to FIGS. 7 and 8, a control signal EN is activated during a ninth timing t9. During the tenth timing t9, the comparison speed detection circuit 212 counts the first to fourth speed pulses WSP1 to WSP4 to generate the first to fourth counting values WSC1 to WSC4. Then, during tenth and eleventh timings t10 and t11, the comparison speed detection circuit 222 transmits the first and second counting values WSC1 and WSC2 to the MCU 230 through a first channel and transmits the third and fourth counting values WSC3 and WSC4 to the MCU 230 through a second channel.

That is, the comparison speed detection circuit 222 transmits the first and second counting values WSC1 and WSC2 as the first comparison speed information CSI1 to the MCU 230 through a time division method and transmits the third and fourth counting values WSC3 and WSC4 as the second comparison speed information CSI2 to the MCU 230 through a time division method.

In exemplary embodiments, according to the embodiments of the present invention described with reference to FIGS. 7 and 8, first and second channels for transmitting first and second comparison speed information CSI1 and CSI2 and a third channel for transmitting/receiving a control signal EN are required. That is, compared to the embodiment of the present invention described with reference to FIG. 2, the number of hardware pins may be increased but since a transmission period of wheel speed information becomes shorter as a period of a control signal EN becomes shorter, the reliability of an electronic control system is further improved. Accordingly, a wheel speed sensor interface having improved reliability and reduced area and an operation method thereof are provided.

Figure 9:
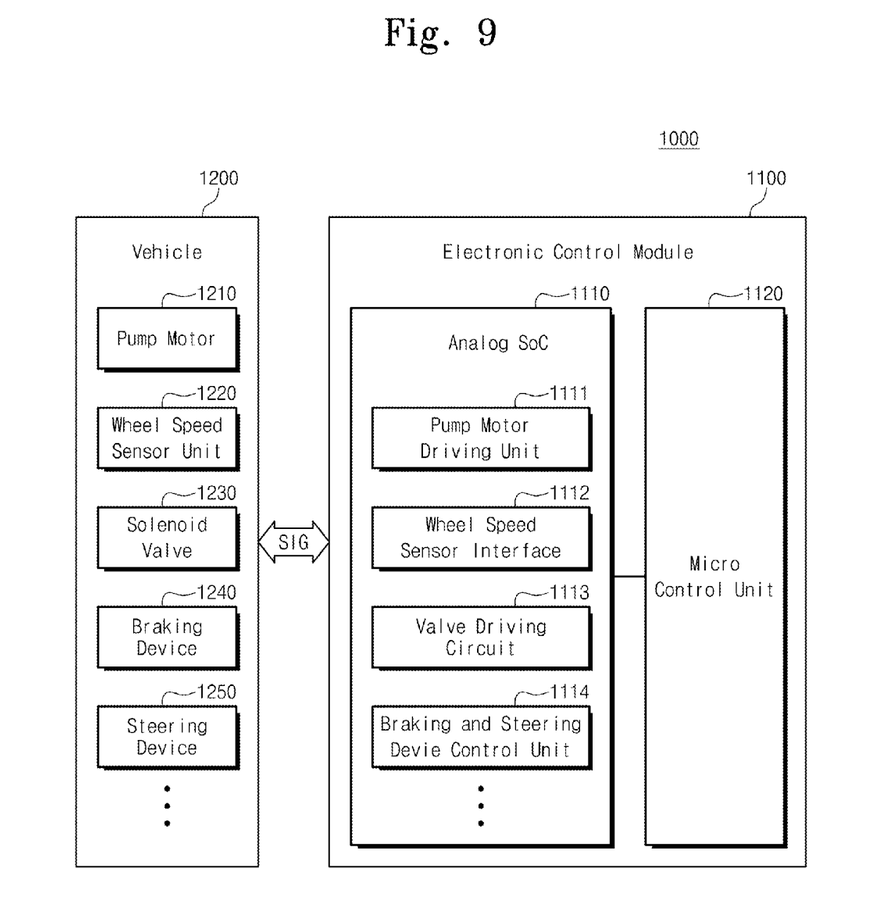
FIG. 9 is a block diagram illustrating a vehicle control system including a wheel speed sensor interface according to an embodiment of the present invention.

FIG. 9 is a block diagram illustrating a vehicle control system including a wheel speed sensor interface according to an embodiment of the present invention. The vehicle control system 1000 includes an electronic control module 1100 and a vehicle 1200.

The electronic control module 1100 detects a state of the vehicle 1200 (for example, a speed, a direction, a position, acceleration, braking, and a fuel state) and controls the vehicle 1200 or components of the vehicle 1200 on the basis of a detected result and driver's manipulation.

The electronic control module 1100 includes an analog SoC 1110 and an MCU 1120. The vehicle 1200 includes components of the vehicle 1200 (for example, a pump motor 1210, a wheel speed sensor unit 1220, a solenoid valve 1230, a braking device 1240, and a steering device 1250) and various sensors for detecting a state of the vehicle 1200.

The analog SoC 1110 receives various sensor signals for checking a state of the vehicle 1200 and transmits the received signals to the MCU 1120. The analog SoC 1110 may control components of the vehicle 11200 according to a control of the MCU 1120. For example, the analog SoC 1110 may include hardware devices controlling components of the vehicle 1200 (for example, a pump motor driving unit 1111, a wheel speed sensor interface 1112, a valve driving circuit 1113, and a braking and steering device control unit 1114) or software programs controlling components of the vehicle 1200.

The MCU 1120 may control the vehicle 1200 or components of the vehicle 1200 on the basis of various signals received from the analog SoC 1110. For example, the MCU 1120 and the wheel speed sensor interface 1112 may operate based on the methods described with reference to FIGS. 1 to 8.

According to the embodiments of the present invention, a wheel speed sensor interface receives a plurality of sensor signals and outputs a plurality of speed pulses on the basis of the plurality of the received sensor signals. An MCU detects a state of a vehicle on the basis of a plurality of speed pulses and based on this, controls a vehicle or components of a vehicle. At this point, a wheel speed sensor interface transmits comparison speed information to an MCU through a time division method in response to a control unit of the MCU. The MCU may detect an error of a plurality of speed pulses on the basis of the comparison speed information. Accordingly, since the number of hardware pins required to transmit speed information for error detection is reduced, a wheel speed sensor interface having improved reliability and reduced area, an operation method thereof, and an electronic control system including the same are provided.

According to embodiments of the present invention, a wheel speed sensor interface transmits reference speed information for detecting a signal error to an MCU through a time division method in order to detect a signal error in response to a control signal of a micro control unit. Therefore, a wheel speed sensor interface having improved reliability and reduced area, an operation method thereof, and an electronic control system including the same are provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An electronic control system of a vehicle comprising a wheel speed sensor interface, a micro control unit, and a wheel speed sensor unit, the wheel speed sensor interface comprising:
a speed pulse detection circuit configured to receive a plurality of sensor signals, each of the plurality of sensor signals including a plurality of pulses indicative of wheel speed information of a vehicle at different times, detect the plurality of pulses to generate a corresponding one of a plurality of speed pulse signals, and transmit the generated speed pulse signals to the micro control unit; and
a comparison speed detection circuit including a plurality of counters each configured to count a number of pulses of a corresponding one of the speed pulse signals during a predetermined period to generate a corresponding one of a plurality of counting values, and a time division multiplexer configured to generate comparison speed information by multiplexing the plurality of counting values based on a time division method, and transmit the generated comparison speed information to the micro control unit; and the micro control unit configured to detect an error of speed pulse signals based on the comparison speed information and control the vehicle based on the speed pulse signals.

2. The electronic control system of claim 1, wherein the comparison speed detection circuit receives a control signal output from the micro control unit, and
wherein when the control signal of the micro control unit is activated, the plurality of counters each count the number of pulses of said corresponding one of the generated speed pulse signals, and when the control signal of the micro control unit is deactivated, the time division multiplexer transmits the comparison speed information to the micro control unit.

3. The electronic control system of claim 2, wherein when the comparison speed information is transmitted completely, the time division multiplexer outputs a reset signal.

4. The electronic control system of claim 3, wherein the plurality of the counters reset the plurality of the generated counting values in response to the reset signal.

5. The electronic control system of claim 1, wherein the time division multiplexer transmits the comparison speed information to the micro control unit through a single channel.

6. The electronic control system of claim 1, wherein the plurality of pulses indicative of the wheel speed information is a first plurality of pulses, and wherein each of the plurality of sensor signals further includes a second plurality of pulses indicative of wheel state information.

7. The electronic control system of claim 6, wherein each of the plurality speed pulse signals indicates speed information on a corresponding one of wheels of the vehicle.

8. An operation method of an electronic control system of a vehicle, the electronic control system comprising a wheel speed sensor interface, a micro control unit, and a wheel speed sensor unit, the wheel speed sensor interface including a speed pulse detection circuit transmitting a plurality of speed pulse signals to an micro control unit and a comparison speed detection circuit generating a plurality of counting values based on the plurality of speed pulse signals, the method comprising:
receiving, by the speed pulse detection circuit, a plurality of sensor signals including speed information on wheels of a vehicle, each of the plurality of sensor signals including a plurality of pulses indicative of the speed information at different times;
detecting, by the speed pulse detection circuit, the plurality of pulses to generate a corresponding one of the plurality of speed pulse signals;
receiving, by the comparison speed detection circuit, an activated control signal from the micro control unit;
counting, by the comparison speed detection circuit, a number of pulses of a corresponding one of the generated speed pulse signals during a predetermined period;
generating, by the comparison speed detection circuit, the plurality of counting values each corresponding to the counted number of pulses of the corresponding one of the speed pulse signals;
generating, by the comparison speed detection circuit, comparison speed information by multiplexing the plurality of counting values based on a time division method and transmitting, by the comparison speed detection circuit, the comparison speed information to the micro control unit; detecting, by the micro control unit, an error of the speed pulse signals based on the comparison speed information and controlling the vehicle based on the speed pulse signals; and
resetting, by the comparison speed detection circuit, the plurality of counting values after the comparison speed information is transmitted.

9. The method of claim 8, wherein, when the control signal is deactivated, the comparison speed information is generated and transmitted to the micro control unit.

10. The method of claim 8, wherein generating the plurality of counting values is performed using a plurality of counters each generating a corresponding one of the counting values.

* * * * *